(12) United States Patent
Armstrong et al.

(10) Patent No.: US 7,882,326 B2
(45) Date of Patent: Feb. 1, 2011

(54) LIVE MIGRATION OF A LOGICAL PARTITION

(75) Inventors: William Joseph Armstrong, Rochester, MN (US); David Anthony Larson, Rochester, MN (US); Naresh Nayar, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 984 days.

(21) Appl. No.: 11/690,174

(22) Filed: Mar. 23, 2007

(65) Prior Publication Data

US 2008/0235482 A1 Sep. 25, 2008

(51) Int. Cl.
G06F 12/00 (2006.01)
G06F 21/00 (2006.01)
G06F 13/00 (2006.01)
G06F 13/28 (2006.01)
G06F 9/455 (2006.01)

(52) U.S. Cl. .................. 711/173; 711/6; 718/1
(58) Field of Classification Search .............. None
See application file for complete search history.

(56) References Cited

U.S. PATENT DOCUMENTS 7,484,208 B1 * 1/2009 Nelson .................. 718/1

2003/0212854 A1 * 11/2003 Kitamura et al. .......... 711/112

OTHER PUBLICATIONS

Clark et al., Live Migration of Virtual Machines, 2005, USENIX Association, 14 pages.*

* cited by examiner

Primary Examiner—Kevin L Ellis
Assistant Examiner—Gary W Cygiel
(74) Attorney, Agent, or Firm—Martin & Associates, LLC; Derek P. Martin

(57) ABSTRACT

A partition migration mechanism migrates a logical partition executing an operating system and resumes the logical partition before all resources in the logical partition have been migrated. When a partition is being migrated, a call checkpoint mechanism creates checkpoints of the state of the operating system when the partition manager is called. Before performing the call to the partition manager, a check is made to determine if all resources required by the call are available. If so, the partition manager call is executed. If all resources required by the call are not available, a resource fault is indicated, which causes the operating system state from the last checkpoint to be restored and a corresponding virtual CPU to be preempted until the resource that caused the fault becomes available. Exceptions that do not require the missing resource may be performed while the virtual CPU awaits the resource to become available.

20 Claims, 5 Drawing Sheets

LIVE MIGRATION OF A LOGICAL PARTITION

BACKGROUND

1. Technical Field

This disclosure generally relates to data processing, and more specifically relates to the moving of a logical partition.

2. Background Art

Since the dawn of the computer age, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

The combination of hardware and software on a particular computer system defines a computing environment. Different hardware platforms and different operating systems thus provide different computing environments. In recent years, engineers have recognized that it is possible to provide different computing environments on the same physical computer system by logically partitioning the computer system resources to different computing environments. The Series p computer system developed by IBM is an example of a computer system that supports logical partitioning. If logical partitioning on a Series p computer system is desired, partition manager code (referred to as a "hypervisor" in Series p terminology) is installed that allows defining different computing environments on the same platform. Once the partition manager is installed, logical partitions may be created that define different computing environments. The partition manager manages the logical partitions to assure that they can share needed resources in the computer system while maintaining the separate computing environments defined by the logical partitions.

A computer system that includes multiple logical partitions typically shares resources between the logical partitions. For example, a computer system with a single CPU could have two logical partitions defined, with 50% of the CPU allocated to each logical partition, with 33% of the memory allocated to the first logical partition and 67% of the memory allocated to the second logical partition, and with two different I/O slots allocated to the two logical partitions, one per partition. Once logical partitions are defined and shared resources are allocated to the logical partitions, each logical partition acts as a separate computer system. Thus, in the example above that has a single computer system with two logical partitions, the two logical partitions will appear for all practical purposes to be two separate and distinct computer systems.

There are times when a logical partition needs to be moved. For example, if a new computer system is installed to take over the functions of an old computer system that is running logical partitions, the logical partitions on the old computer system need to be moved, or migrated, to the new computer system. However, the operation of migrating a logical partition is time-consuming. If the logical partition cannot be used until the migration is complete, unacceptable delays result. Without a way to migrate a logical partition in a way that allows using the logical partition before the migration is complete, the computer industry will continue to suffer from excessive downtime when migrating logical partitions.

BRIEF SUMMARY

A partition migration mechanism moves a logical partition that is executing an operating system and resumes the logical partition before all of the resources in the logical partition have been migrated. When a partition is being migrated, a call checkpoint mechanism creates checkpoints of the state of the operating system when the partition manager is called. Before performing the call to the partition manager, a check is made to determine if all resources required by the call are available. If so, the partition manager call is executed. If all resources required by the call are not available, a resource fault is indicated, which causes the operating system state from the last checkpoint to be restored and a corresponding virtual CPU to be preempted until the resource that caused the fault becomes available. Exceptions that do not require the resource that caused the fault may be performed while the virtual CPU awaits the resource to become available. The result is a system that can very quickly migrate a logical partition with a minimum of downtime.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

The claims and disclosure herein allow a logical partition to be migrated as quickly as possible by resuming execution of the logical partition even before the migration of all of its resources is complete. While migration is in progress, a partition migration mechanism records checkpoints in the form of the saved state of the operating system each time the partition manager is called. Before executing the call to the partition manager, the partition manager assures the resources required for the call are available. If all of the required resources are not available, the state of the operating system is restored from the previously-stored checkpoint, and a corresponding virtual CPU is preempted until the required resource becomes available. While preempted and waiting for a required resource, certain exceptions that were enabled before the preemption may be processed if the exceptions do not require a resource that is not available. In this manner a logical partition may be moved very quickly with a minimum of downtime.

Figure 1:
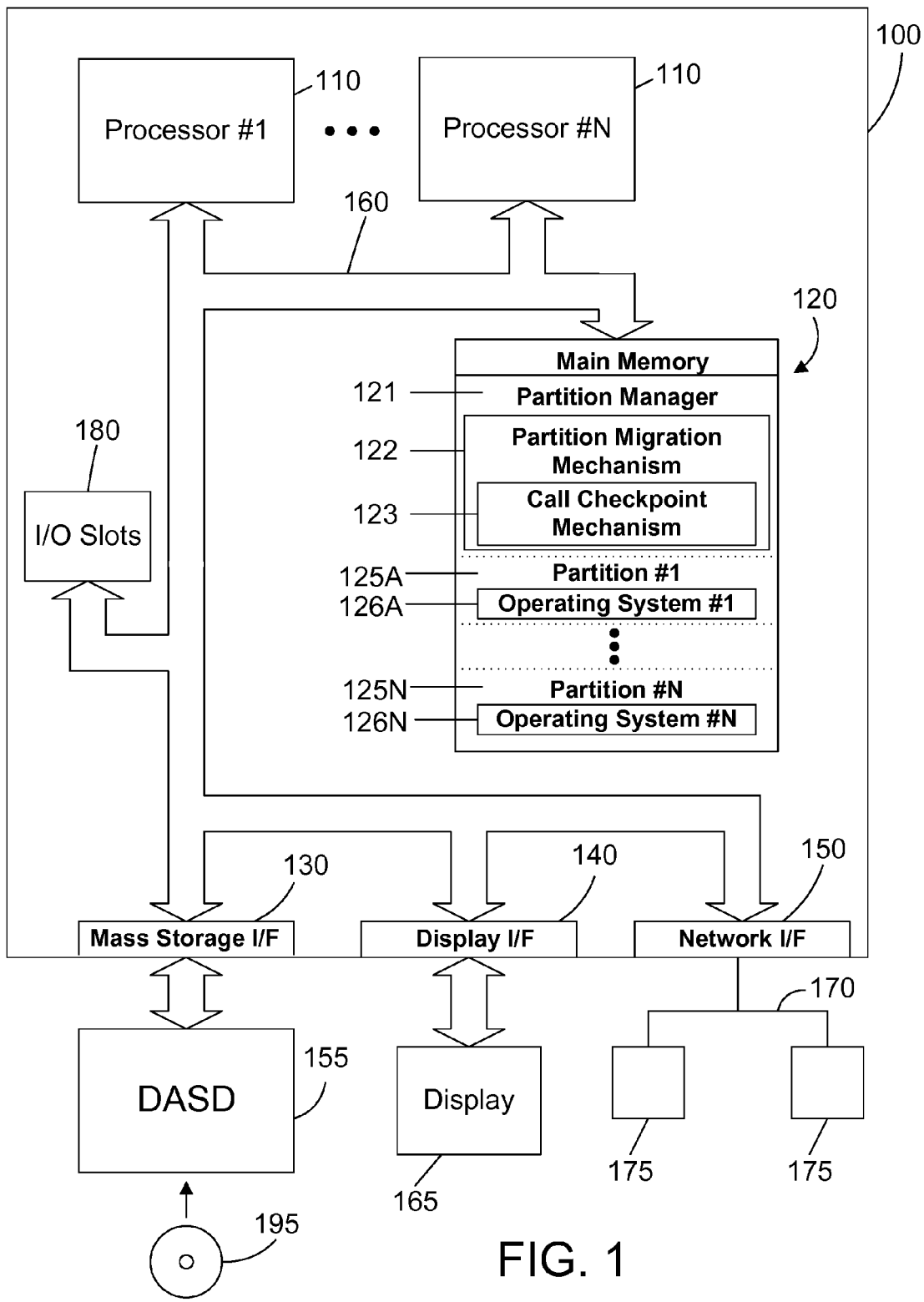
FIG. 1 is a block diagram of a computer apparatus that supports logical partitioning and live partition migration.

Referring to FIG. 1, a computer system 100 is an enhanced IBM eServer Series p computer system, and represents one suitable type of computer system that supports logical partitioning and partition migration. Those skilled in the art will appreciate that the disclosure herein applies equally to any computer system that supports logical partitions. As shown in FIG. 1, computer system 100 comprises one or more processors 110 connected to a main memory 120, a mass storage interface 130, a display interface 140, a network interface 150, and a plurality of I/O slots 180. These system components are interconnected through the use of a system bus 160. Mass storage interface 130 is used to connect mass storage devices (such as a direct access storage device 155) to computer system 100. One specific type of direct access storage device is a CD-RW drive, which may read data from a CD-RW 195. Note that mass storage interface 130, display interface 140, and network interface 150 may actually be implemented in adapters coupled to I/O slots 180. An I/O adapter is one suitable network interface 150 that may be implemented in an external card that is plugged into one of the I/O slots 180. In addition, other I/O devices such as modems can be plugged into one of the I/O slots 180.

Main memory 120 preferably contains a partition manager 121 and N logical partitions, shown in FIG. 1 as logical partitions 125A through 125N. Partition manager 121 preferably creates these N logical partitions. Each logical partition preferably includes a corresponding operating system, shown in FIG. 1 as operating systems 126A through 126N. The partition manager includes a partition migration mechanism 122 that migrates a logical partition and resumes execution of the logical partition in the new location before migration of all the logical partition's resources is complete. This is accomplished using a call checkpoint mechanism 123. While migration is in progress but not yet complete, the call checkpoint mechanism 123 saves the register state of the operating system each time the partition manager is called. Before executing the call to the partition manager, a check is made to see if all the resources required by the call have been migrated. If so, the partition manager call is executed. If one or more required resources is not yet available (i.e., have not yet been migrated), the checkpointed register save state of the operating system is restored, and a virtual CPU corresponding to the call is preempted until all of the required resources are available. The preempted virtual CPU may still process exceptions that were enabled on the operating system before the partition manager was preempted if all required resources for the exception are available. The result is a system that allows very quickly migrating a logical partition with a minimum of downtime. This is referred to herein as "live partition migration" because the partition may be moved and resumed in the new location before migration is complete and without re-starting the logical partition. Practical tests have shown that a logical partition may be migrated as discussed herein with a sub-second delay, thereby providing an acceptable delay when migrating a logical partition.

Operating system 126 is a multitasking operating system, such as AIX, or Linux; however, those skilled in the art will appreciate that the spirit and scope of this disclosure is not limited to any one operating system. Any suitable operating system can be used. Operating system 126 is a sophisticated program that contains low-level code to manage the resources of computer system 100. Some of these resources are processor 110, main memory 120, mass storage interface 130, display interface 140, network interface 150, system bus 160, and I/O slots 180. The operating system 126 in each partition may be the same as the operating system in other partitions, or may be a completely different operating system. Thus, one partition can run the AIX operating system, while a different partition can run another instance of AIX, possibly a different release, or with different environment settings (e.g., time zone or language). The operating systems in the logical partitions could even be different than AIX, provided it is compatible with the hardware (such as Linux). In this manner the logical partitions can provide completely different computing environments on the same physical computer system.

The partitions 125A-125N are shown in FIG. 1 to reside within the main memory 120. However, one skilled in the art will recognize that a partition is a logical construct that includes resources other than memory. A logical partition typically specifies a portion of memory, along with an assignment of processor capacity and other system resources, such as I/O slots 180 and I/O adapters, which may reside in I/O slots 180. Thus, one partition could be defined to include two processors and a portion of memory 120, along with one or more I/O processors that can provide the functions of mass storage interface 130, display interface 140, network interface 150, or interfaces to I/O adapters or other devices (such as modems) plugged into I/O slots 180. Another partition could then be defined to include three other processors, a different portion of memory 120, and one or more I/O processors. The partitions are shown in FIG. 1 to symbolically represent logical partitions, which would include system resources outside of memory 120 within computer system 100. Note also that the partition manager 121 preferably resides in memory and hardware separate from the logical partitions and includes facilities and mechanisms that are not directly available to the logical partitions.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while partition manager 121 and the partitions 125A-125N are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up the partition manager 121, which initializes the operating systems in the logical partitions.

Although computer system 100 is shown to contain only a single system bus, those skilled in the art will appreciate that partition migration as disclosed herein may be practiced using a computer system that has multiple buses. In addition, the I/O interfaces that are used may each include separate, fully programmed microprocessors that are used to off-load compute-intensive processing from processor 110, such as I/O accelerator processors, or may be simple industry standard I/O adapters (IOAs).

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. Network interface 150 and network 170 broadly represent any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the description above is in the context of a fully functional computer system, those skilled in the art will appreciate that the partition manager disclosed and claimed herein is capable of being distributed as an article of manufacture in a variety of forms, and that the claims extend to all suitable types of computer-readable media used to actually carry out the distribution. Examples of suitable computer-readable media include recordable media such as floppy disks and CD-RW (e.g., 195 of FIG. 1).

The partition manager may also be delivered as part of a service engagement with a client corporation, nonprofit organization, government entity, internal organizational structure, or the like. This may include configuring a computer system to perform some or all of the methods described herein, and deploying software, hardware, and web services that implement some or all of the methods described herein. This may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Figure 2:
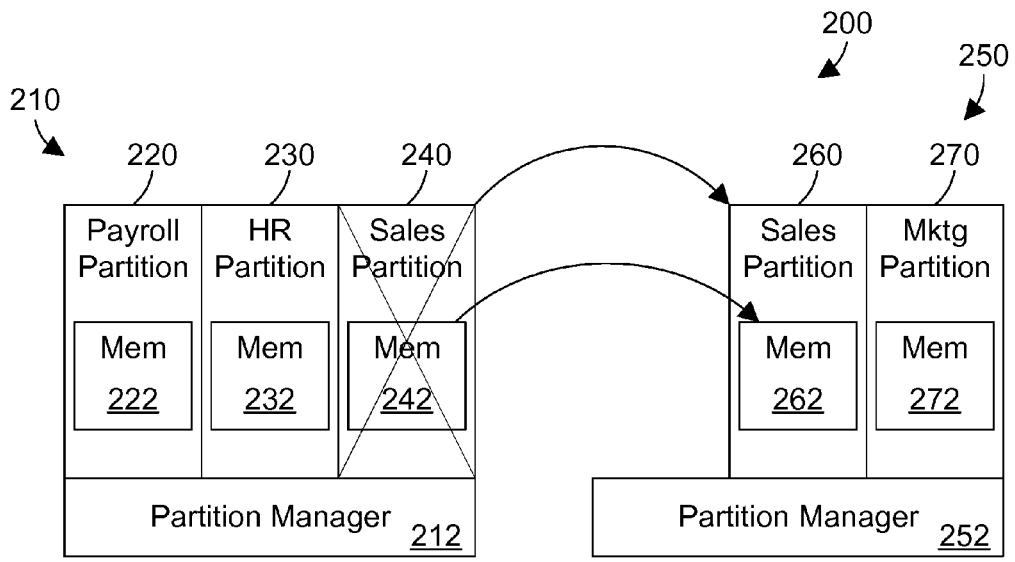
FIG. 2 is a sample networked computer system showing the migration of a logical partition between two computer systems.

Referring to FIG. 2, a sample networked computer system 200 is shown to illustrate the concepts of migrating logical partitions. A first computer system 210 includes a partition manager 212 that manages the function of three logical partitions, namely payroll partition 220, HR partition 230, and sales partition 240. Each partition has corresponding memory. Thus payroll partition 220 has corresponding memory 222, HR partition has corresponding memory 232, and sales partition 240 has corresponding memory 242. We assume a second computer system 250 is coupled to the first computer system 210, and includes a partition manager 252 that manages the function of a marketing partition 270 with corresponding memory 272. We assume the sales partition 240 needs to be moved from computer system 210 to computer system 220. This may be done in different ways in the prior art.

Figure 3:
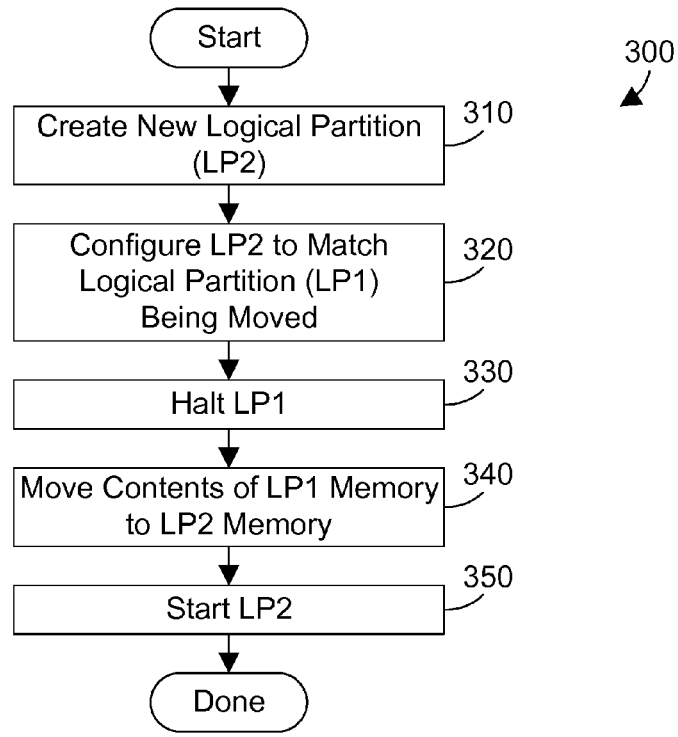
FIG. 3 is a flow diagram of a first prior art method for migrating a logical partition.

Referring to FIG. 3, a first method for moving a logical partition we'll call LP1 begins by creating a new logical partition we'll call LP2 in the new location (step 310). Referring to FIG. 2, this means the logical partition 260 on computer system 250 is created. Next, the new logical partition LP2 is configured to match the logical partition LP1 being moved (step 320). For our example in FIG. 2, this means resources similar to those allocated in the old logical partition 240 are allocated to the new logical partition 260. Next, the first logical partition is halted (step 240), and the contents of the memory are moved to memory in the new location (step 250). In the example in FIG. 2, this means the data in memory 242 is written to the memory 262 in the new location. The old logical partition 240 has to be halted in step 330 before the data in memory 242 is written to the new location 262 to prevent the old partition 240 from changing the data while it is being copied. Once all required resources, including memory, have been transferred to the new location, the logical partition in the new location is started (step 350). Note the starting of the logical partition in step 350 requires booting the operating system in the logical partition, which requires a significant amount of time, thereby creating a significant delay that is not acceptable in many circumstances.

Figure 4:
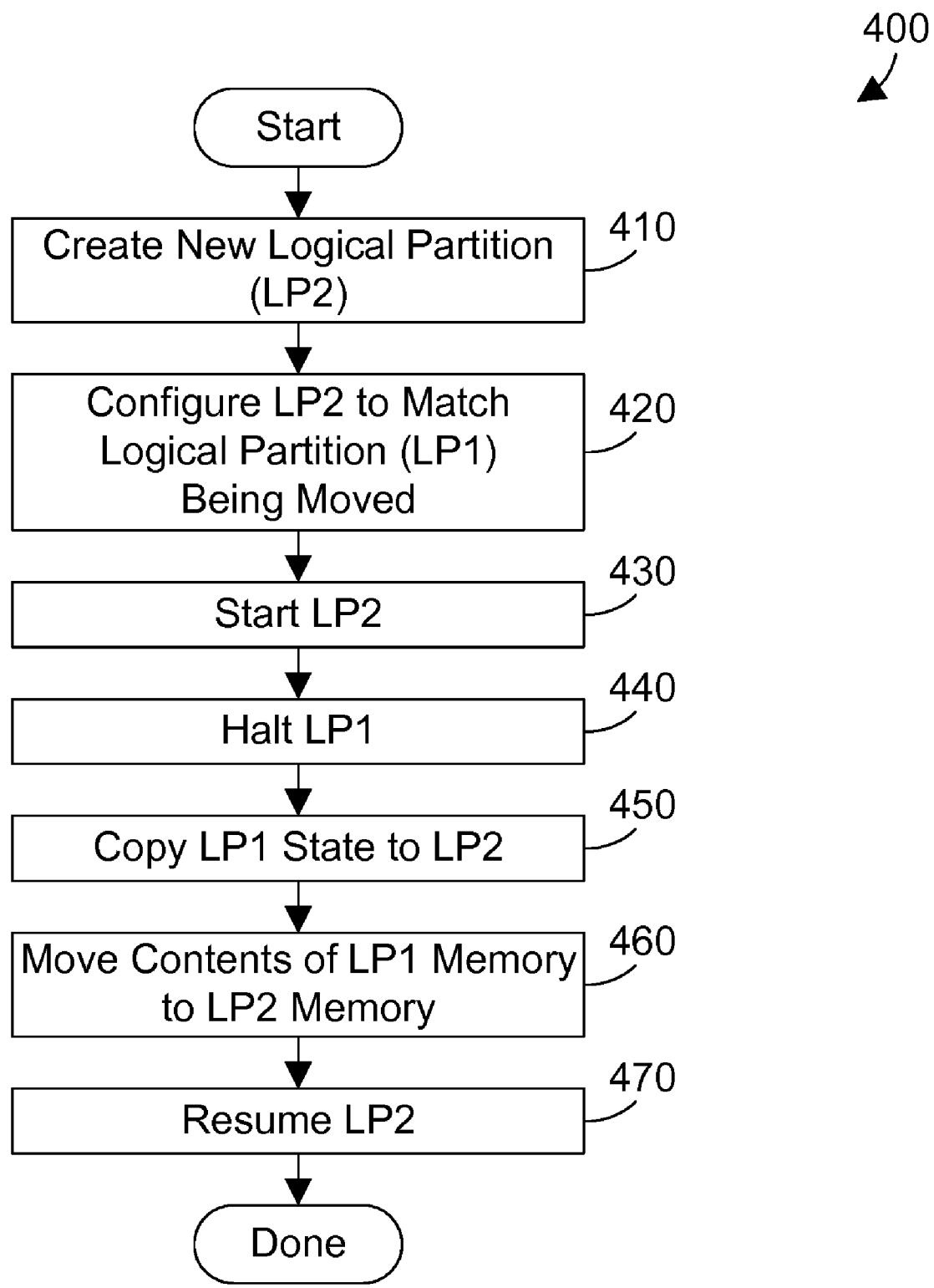
FIG. 4 is a flow diagram of a second prior art method for migrating a logical partition.

Another prior art method 400 for moving a logical partition is shown in FIG. 4. This is known as "live migration" because the logical partition is resumed in the new location without the delay of booting the operating system in the new partition. The new logical partition is created (step 410). The new logical partition is configured to match the old logical partition (step 420). The new logical partition is then started (step 430), which boots the operating system. Once the operating system in the new logical partition is up and running, the old logical partition is halted (step 440). The state of the old logical partition is then copied to the new logical partition (step 450). The contents of the memory in the old logical partition are then moved to the memory in the new logical partition (step 460). The second logical partition may then be resumed, which allows the new logical partition to begin immediately executing where the old logical partition left off due to the copying of state data in step 450 and memory in step 460. Prior art method 400 improves upon prior art method 300 in FIG. 3 by allowing the operating system in the new logical partition to boot up before the transfer occurs. Note, however, that there is still a significant delay between the halting of the old logical partition in step 440 and resuming the second logical partition in step 470. In particular, the moving of the memory contents in step 460 may take considerable time. Having the logical partition halted until the memory copying in step 460 is complete results in a significant delay that is still not acceptable in many circumstances.

To address the problem of excessive delays when migrating a logical partition, the disclosure and claims herein provide live migration of a logical partition in a way that resumes the logical partition before all of the resources (such as memory) are available in the new logical partition. Some known partition managers run in an execution environment that does not have any hardware relocation features enabled. At this low level of firmware, there is simply no hardware address translation involved that could generate a page fault or similar exception when an attempt is made to access a resource that isn't available yet. As a result, the disclosure and claims provide a novel and non-obvious way to detect faults when a resource is not available during partition migration, allowing live migration of a logical partition and resuming the logical partition before all resources on the logical partition are available.

Figure 5:
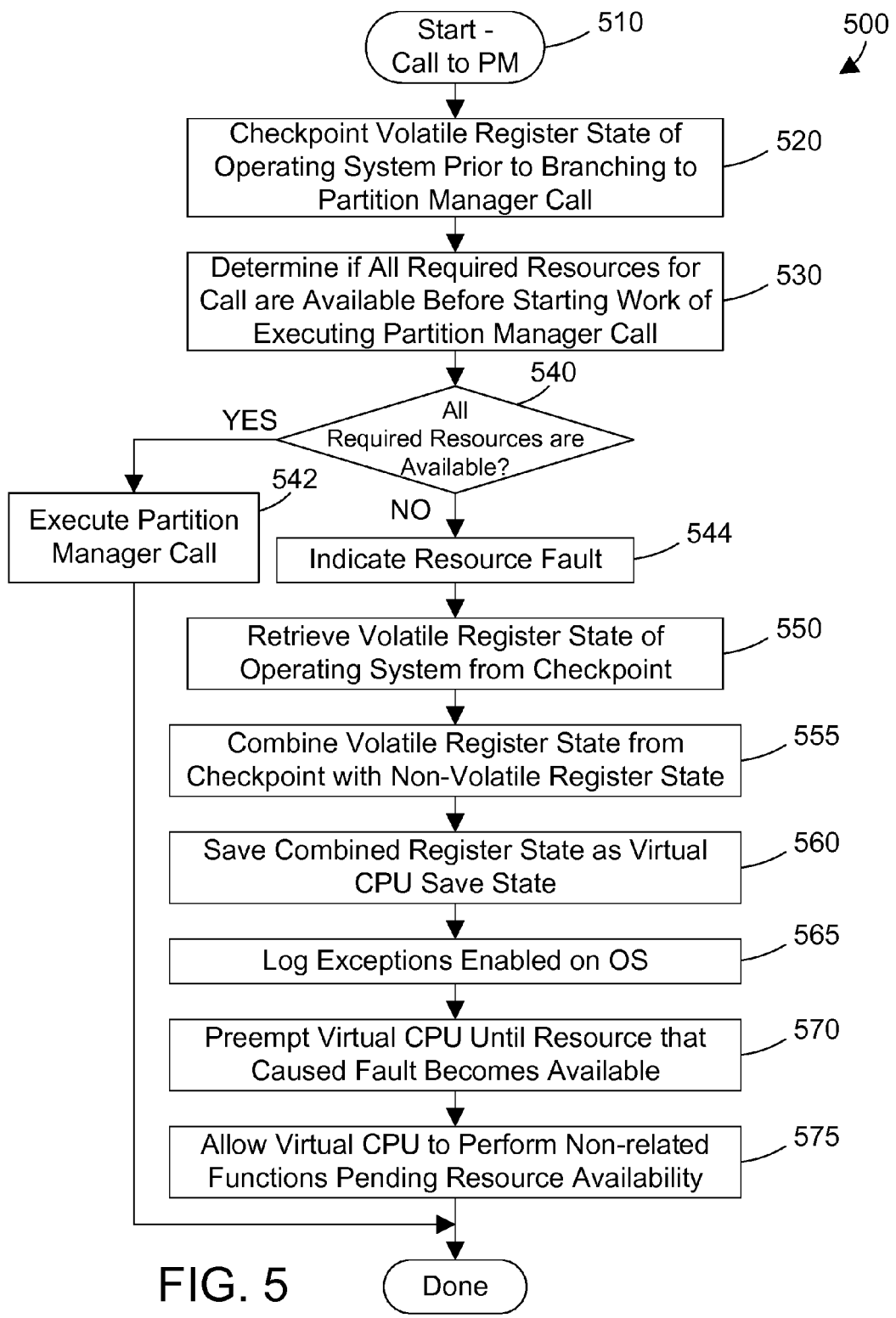
FIG. 5 is a flow diagram showing a method for performing live migration of a logical partition.

Referring to FIG. 5, a method 500 is preferably performed by the partition migration mechanism 122 in FIG. 1. Method 500 begins when a call is made to the partition manager during migration of a logical partition (step 510), i.e., when a call to the partition manager is made after migration of the logical partition has commenced but before it has completed. First, a checkpoint is made of the volatile register state of the operating system prior to branching to the partition manager call (step 520). A checkpoint is simply a snapshot in time of the volatile register state of the operating system. Next, the partition manager call determines whether or not all the required resources to the call to the partition manager are available before starting the work of executing the partition manager call (step 530). If all the required resources are available (step 540=YES), the partition manager call is executed (step 542). If all of the required resources for the partition manager call are not available (step 540=NO), a resource fault is indicated (step 544). In response to the resource fault, the volatile register state of the operating system is retrieved from the last checkpoint (step 550). The retrieved volatile register state of the partition manager is then combined with the non-volatile register state of the partition manager (step 555) to provide an accurate representation of the save state of the partition manager just prior to the call to the partition manager. The combined register state is saved as the save state of a virtual CPU (step 560) that corresponds to the call to the partition manager. The exceptions that were enabled on the operating system in the logical partition prior to the call to the partition manager are logged (step 565). The virtual CPU corresponding to the call to the partition manager is then preempted until the resource that caused the resource fault in step 544 becomes available (step 570). While the virtual CPU is preempted in step 570, it may still perform non-related functions for which all the resources are available pending availability of the resource that caused the resource fault in step 544 (step 575). Method 500 provides a way to resume a logical partition in a new location before migration of the logical partition is complete by providing a very simple way to detect resource faults and to handle resource faults in a partition manager.

Figure 6:
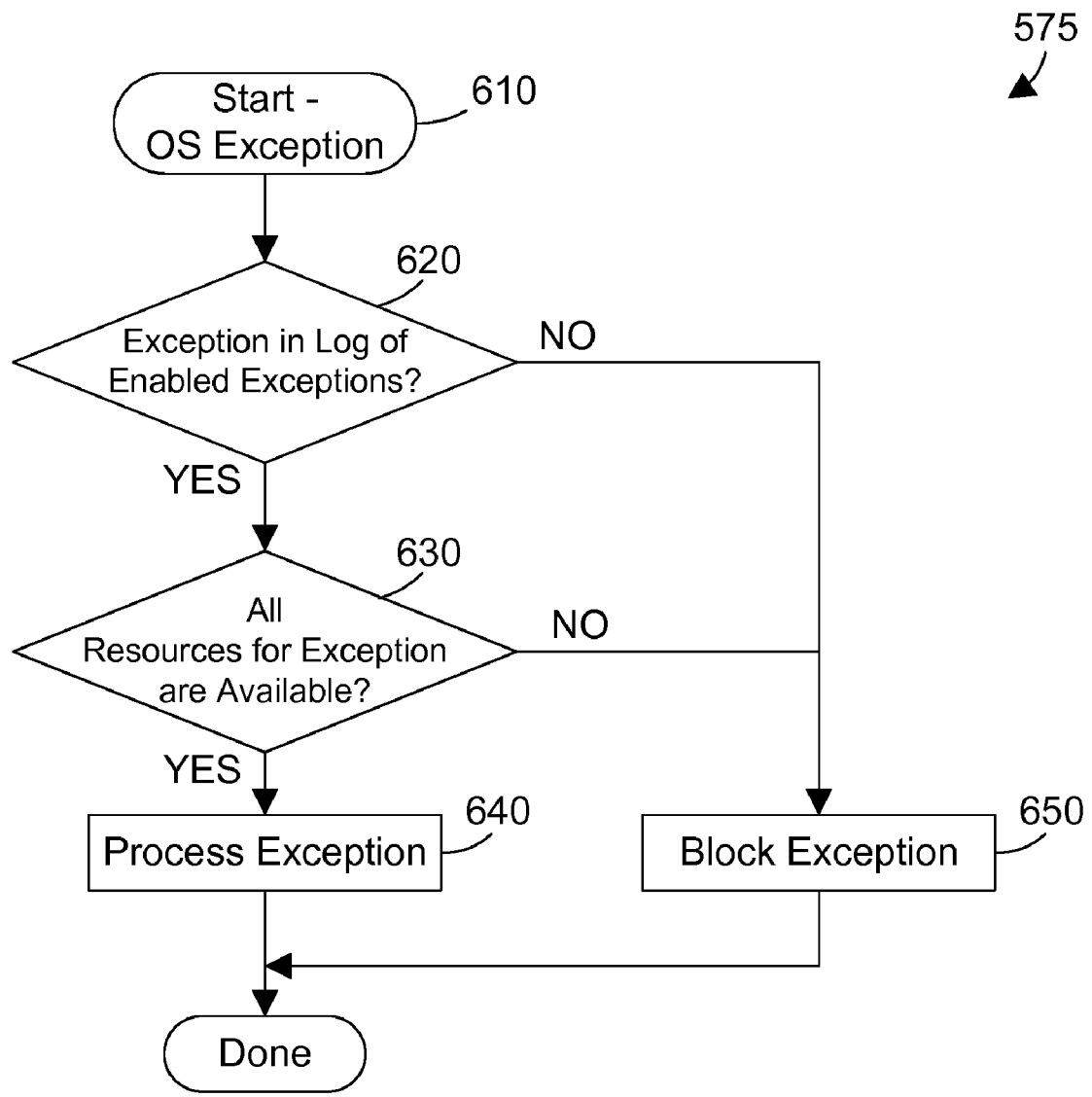
FIG. 6 is a flow diagram showing one possible implementation for step 575 in FIG. 5.

One suitable implementation for step 575 in FIG. 5 is shown as method 575 in FIG. 6. Method 575 begins when an exception occurs in the operating system running on the logical partition (step 610). If the exception is in the log of enabled exceptions created in step 565 in FIG. 5 (step 620=YES), and if all resources for the exception are available (step 630=YES), the exception is processed (step 640), even though the virtual CPU is still preempted and waiting for the resource that caused the resource fault. If the exception is not in the log of enabled exceptions (step 620=NO), or if one or more resources for the exception are unavailable (step 630=NO), the exception is blocked (step 650), meaning the exception is not allowed to run until the migration of the resource that caused the resource fault is complete.

The disclosure and claims herein provide a simple and efficient way for live migration of a logical partition and resuming the logical partition before the migration of all of the resources in the logical partition is complete. This is a great benefit when a logical partition has a large block of memory that must be migrated. Instead of waiting an unacceptable amount of time for the block of memory to be transferred before resuming the partition in its new location, the partition may be resumed after only a small portion of the memory has been migrated. Practical tests have shown that using such a system allows live migration of a logical partition in less than a second in many situations, which provides an acceptable delay when migrating a logical partition.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, while the specific examples herein relate to memory resources, the disclosure and claims expressly extend to all resources in a logical partition.

What is claimed is:

1. An apparatus comprising:
   at least one processor;
   a memory coupled to the at least one processor;
   a logical partition defined on the apparatus that executes an operating system;
   a partition manager residing in the memory and executed by the at least one processor, the logical partition executing in a first location under control of the partition manager, the partition manager comprising:
   a partition migration mechanism that migrates the logical partition to a second location, the partition migration mechanism including a call checkpoint mechanism that saves a checkpoint of state of the operating system each time the partition manager is called during the migration of the logical partition from the first location to the second location, the partition migration mechanism determining whether all required resources for each call to the partition manager are available, and if not, the partition migration mechanism restores the state of the operating system from the last checkpoint and preempts a corresponding virtual processor in the second location until the required resource is available.

2. The apparatus of claim 1 wherein the partition migration mechanism enables the corresponding virtual processor when the required resource is available.

3. The apparatus of claim 1 wherein the second location comprises a computer system coupled to the apparatus.

4. The apparatus of claim 1 wherein the partition manager logs functions enabled on the operating system when the corresponding virtual processor is preempted, and allows the preempted virtual processor to perform any of the enabled functions that only require resources that are available in the second location.

5. The apparatus of claim 4 wherein the functions comprise exceptions.

6. The apparatus of claim 1 wherein the partition manager executes a call when all required resources for the call are available in the second location.

7. A computer-implemented method for migrating a logical partition executing an operating system from a first location to a second location, the method comprising the steps of:
   starting migration of the logical partition from the first location to the second location;
   before the migration of the logical partition from the first location to the second location is complete, enabling the logical partition in the second location;
   for each call to a partition manager in the logical partition in the second location before the migration of the logical partition from the first location to the second location is complete, storing a checkpoint of state of the operating system prior to executing the call;
   before executing the call, determining if all resources required for the call have been migrated to the second location;
   if all the required resources for the call have been migrated to the second location, executing the call to the partition manager;
   if all the required resources for the call have not yet been migrated to the second location, performing the steps of:
      restoring the state of the operating system from the last checkpoint; and
      preempting a corresponding virtual processor until the required resource is available.

8. The method of claim 7 further comprising the step of enabling the corresponding virtual processor when the required resource is available.

9. The method of claim 7 wherein the second location comprises a second computer system different than a first computer system that defines the first location.

10. The method of claim 7 further comprising the steps of:
    logging functions enabled on the operating system when the corresponding virtual processor is preempted; and allowing the preempted virtual processor to perform any enabled functions that only require resources that are available in the second location.

11. The method of claim 10 wherein the functions comprise exceptions.

12. The method of claim 7 further comprising the step of the partition manager executing a call when all required resources for the call are available in the second location.

13. A method for deploying computing infrastructure, comprising integrating computer readable code into a computing system, wherein the code in combination with the computing system perform the method of claim 7.

14. A computer-implemented method for migrating a logical partition executing an operating system from a first location to a second location, the method comprising the steps of:

starting migration of the logical partition from the first location to the second location;

before the migration of the logical partition from the first location to the second location is complete, enabling the logical partition in the second location;

for each call to a partition manager in the logical partition in the second location before the migration of the logical partition from the first location to the second location is complete, storing a checkpoint of register state of the operating system prior to executing the call;

before executing the call, determining if all resources required for the call have been migrated to the second location;

if all the required resources for the call have been migrated to the second location, executing the call to the partition manager;

if all the required resources for the call have not yet been migrated to the second location, performing the steps of:

logging functions enabled on the operating system when the corresponding virtual processor is preempted;

restoring the register state of the operating system from the last checkpoint;

preempting a corresponding virtual processor until the required resource is available;

allowing the preempted virtual processor to perform any enabled functions that only require resources that are available in the second location; and enabling the corresponding virtual processor when the required resource becomes available.

15. An article of manufacture comprising:

(A) a partition manager comprising a partition migration mechanism that migrates a logical partition executing an operating system from a first location to a second location, the partition migration mechanism including a call checkpoint mechanism that saves a checkpoint of state of the operating system each time the partition manager is called during the migration of the logical partition from the first location to the second location, the partition migration mechanism determining whether all required resources for each call to the partition manager are available, and if not, the partition migration mechanism restores the state of the operating system from the last checkpoint and preempts a corresponding virtual processor in the second location until the required resource is available; and (B) computer readable media bearing the partition manager.

16. The article of manufacture of claim 15 wherein the partition migration mechanism enables the corresponding virtual processor when the required resource is available.

17. The article of manufacture of claim 15 wherein the second location comprises a computer system coupled to the apparatus.

18. The article of manufacture of claim 15 wherein the partition manager logs functions enabled on the operating system when the corresponding virtual processor is preempted, and allows the preempted virtual processor to perform any of the enabled functions that only require resources that are available in the second location.

19. The article of manufacture of claim 18 wherein the functions comprise exceptions.

20. The article of manufacture of claim 15 wherein the partition manager executes a call when all required resources for the call are available in the second location.

* * * * *